United States Patent [19]
Baker et al.

[11] Patent Number: 6,023,562
[45] Date of Patent: Feb. 8, 2000

[54] NETWORK UPDATING ARRANGEMENT USING SIMULATED ANNEALING PROCESS TO SELECT LEVEL OF SERVICE CAPABILITIES OF PERMANENT GROUPED COMMUNICATION LINKS WITHOUT CHANGING NETWORK TOPOLOGY

[75] Inventors: Stephen Charles Baker, British Columbia, Canada; Ian Barry Crabtree, Ipswich, United Kingdom

[73] Assignee: British Telecommunications public limited company, London, United Kingdom

[21] Appl. No.: 08/507,316

[22] PCT Filed: Dec. 16, 1994

[86] PCT No.: PCT/GB94/02752

§ 371 Date: Aug. 22, 1995

§ 102(e) Date: Aug. 22, 1995

[87] PCT Pub. No.: WO95/17075

PCT Pub. Date: Jun. 22, 1995

Related U.S. Application Data

[63] Continuation-in-part of application No. 08/208,896, Mar. 14, 1994, abandoned.

[30] Foreign Application Priority Data

Dec. 16, 1993 [EP] European Pat. Off. .............. 93310182

[51] Int. Cl.[7] ....................................................... G06F 13/00
[52] U.S. Cl. ................................. 395/200.71; 395/200.74
[58] Field of Search ........................... 395/13, 51, 200.71, 395/200.74; 709/241, 244; 379/201

[56] References Cited

U.S. PATENT DOCUMENTS

| | | | |
|---|---|---|---|
| 5,175,800 | 12/1992 | Galis et al. | 706/45 |
| 5,255,345 | 10/1993 | Shaefer | 706/13 |
| 5,426,674 | 6/1995 | Nemirovsky et al. | 395/200.71 |
| 5,491,742 | 2/1996 | Harper et al. | 379/201 |
| 5,596,703 | 1/1997 | Eick et al. | 345/326 |
| 5,598,532 | 1/1997 | Liron | 364/488 |

OTHER PUBLICATIONS

Press, William H., et al., "Numerical Recipes in C. The Art of Scientific Computing", pp. 342–352.

*Primary Examiner*—Le Hien Luu
*Attorney, Agent, or Firm*—Nixon & Vanderhye, P.C.

[57] ABSTRACT

A method and arrangement are provided for network update operations in communications network technology. A simulated annealing technique is used to generate a solution to the problem of providing minimum service capabilities via links of the network, at minimum cost, particularly in terms of the number of exchanges to be updated. Two operations are provided in particular which increase the speed at which a solution is generated while avoiding, at least to a significant extent, the effect of local minima.

8 Claims, 5 Drawing Sheets

Fig. 2. Principal Wire data structures
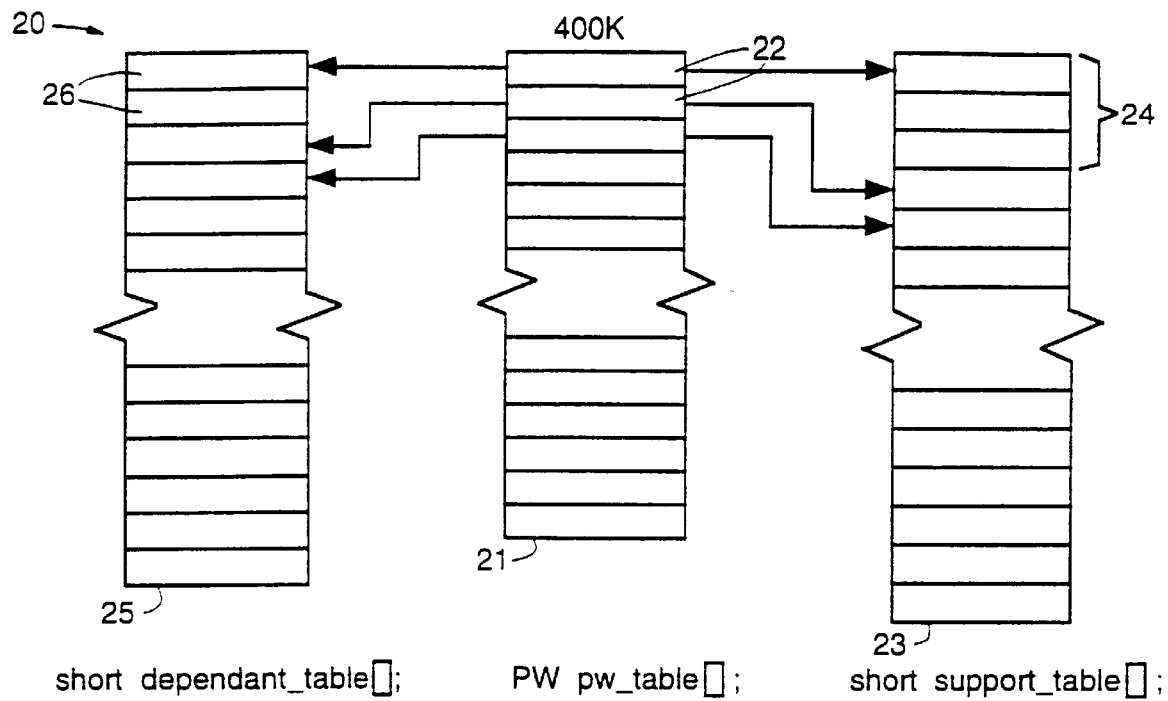
short dependant_table[ ];   PW pw_table[ ];   short support_table[ ];
Fig. 3. Exchange data structures
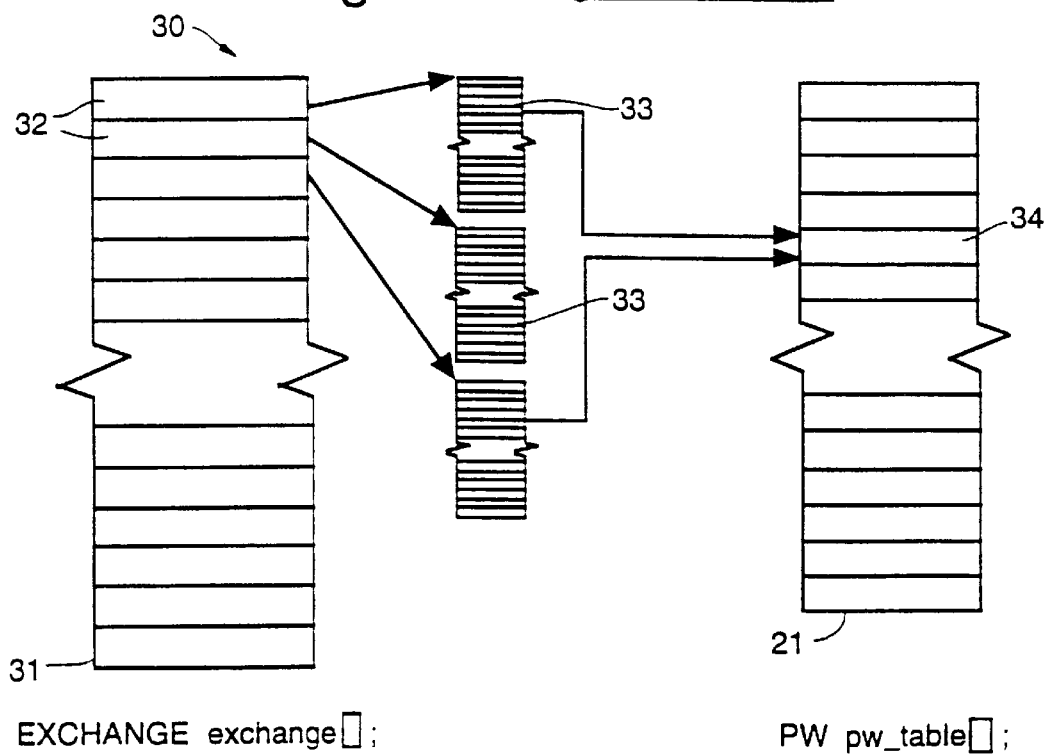
EXCHANGE exchange[ ];   PW pw_table[ ];

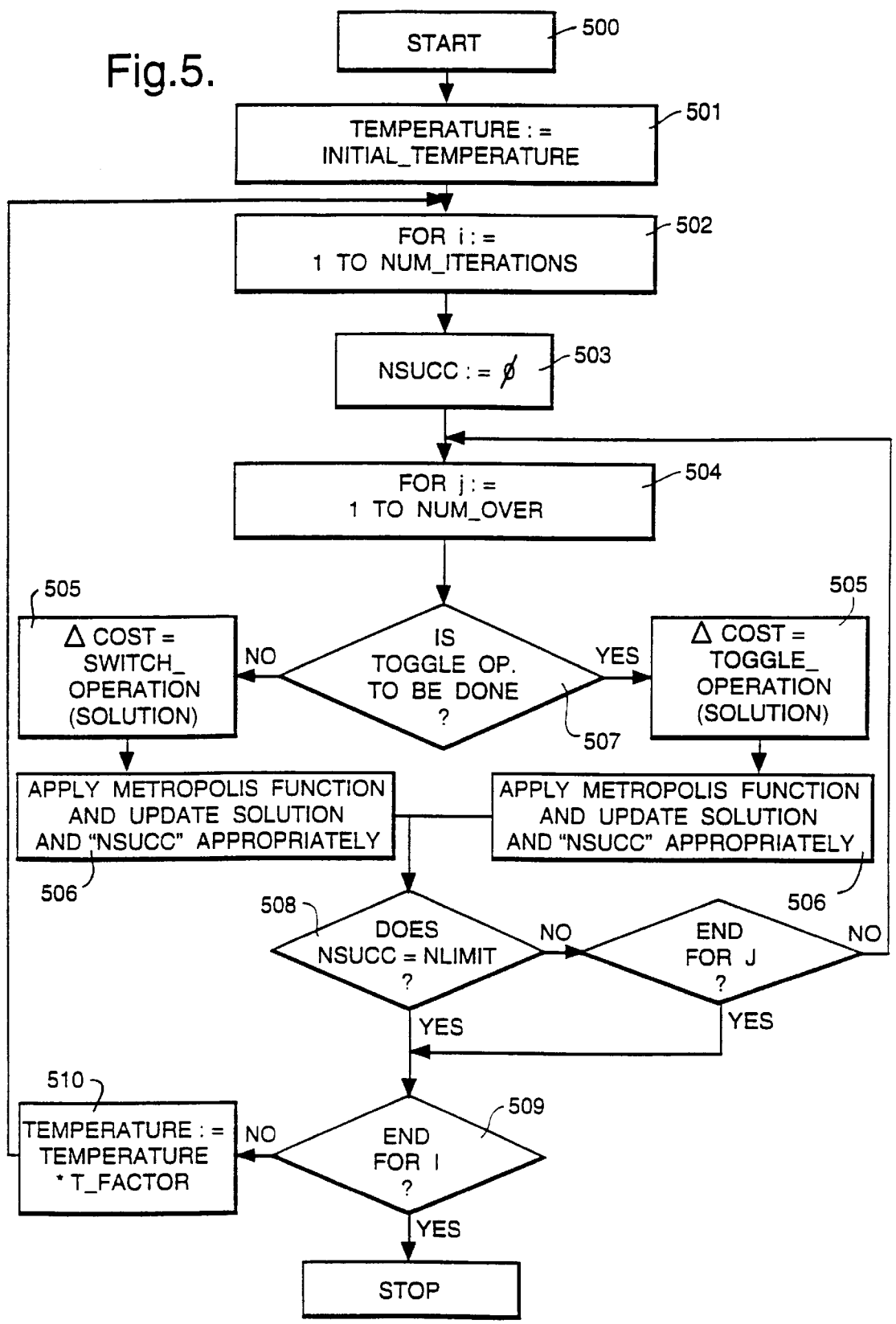

NETWORK UPDATING ARRANGEMENT USING SIMULATED ANNEALING PROCESS TO SELECT LEVEL OF SERVICE CAPABILITIES OF PERMANENT GROUPED COMMUNICATION LINKS WITHOUT CHANGING NETWORK TOPOLOGY

CROSS-REFERENCE TO RELATED APPLICATION

This application is a 371 of PCT/GB94/02752 filed Dec. 16, 1994, which is a continuation-in-part of our copending commonly assigned application Ser. No. 08/208,896 filed Mar. 14, 1994, now abandoned.

FIELD OF THE INVENTION

The present invention relates to arrangements for updating communication networks.

BACKGROUND OF THE INVENTION

Communications networks will generally comprise communication channels, or links, connected by exchanges, or switches. The route taken by data (or voice messages) travelling from one set of terminal equipment via the network to another set of terminal equipment is determined by the switches. The capacity, that is the maximum amount of data, which can be transported in a fixed length of time, can be limited by the mature of the links. However much more significantly, the service which can be provided on those links can be dictated by the exchange design. If a network operator wants to update the services it can offer to customers, it must then first update its exchanges.

This can obviously present a major cost, particularly where a network is extensive. In Britain, looking at the private line area, some 6000 exchanges support one million private wires. Hence the migration of exchanges even to support one million private wires, this being only part of the private wire business provided by British Telecommunications PLC, is both large scale and high profile.

It is not possible to upgrade all of the exchanges at the same time and it is therefore necessary to develop an updating arrangement which will meet a number of constraints. In particular, it is clearly important to minimise upgrade costs but to maximise customer benefit.

This has been a substantial problem in the past. Any exchange upgrading process, apart from the unattainable option of updating 100% of exchanges, will have consequential effects in terminal of the service capabilities available to different terminal equipment. In the past, upgrading arrangements have relied substantially on guess work and have taken of the order of several (for instance 15) hours to generate a solution.

SUMMARY OF THE INVENTION

According to a first aspect of the present invention, there is provided a network updating arrangement, for a network which comprises a plurality of communication links with associated switches, each switch having an update status selected from at least two alternative statuses, the service capabilities of each link being functionally affected by the update status of at least one switch, and the links being grouped according to allocated identifiers, each group sharing a common identifier, the arrangement comprising a database system for logging an update status indicator for each switch, the database system comprising data stored in at least two different data structures, these comprising a link data structure and a switch data structure, the link data structure logging for each link of the network its allocated identifier or identifiers and all switches whose update status functionally affects the service capabilities of that link, and the switch data structure providing for each switch an index to the link data structure, logging thereby all links whose service capabilities are functionally affected by the update status of that switch, and storing for each switch the update status indicator, the arrangement further comprising data input means to the link data structure, for selecting, in respect of one or more identifiers, a minimum number of the links in the group of links for which it is the common identifier, and indicating means responsive to said selection to indicate one or more of the switches whose update status can be changed to enable predetermined service capabilities to be provided on said minimum number of links.

The common identifier can be for instance related to a particular customer. Hence, in a network updating arrangement as described above, a solution can be generated to the problem of providing a minimum number of links of increased service capabilities to specified customers.

According to a second aspect of the present invention, there is provided a network updating arrangement, for a network which comprises a plurality of communication links with associated switches, each switch having an update status selected from at least two alternative statuses, the service capabilities of each link being functionally affected by the update status of at least one switch, and the links being grouped according to allocated identifiers, each group sharing a common identifier, the arrangement comprising a database system for logging an update status indicator for each switch, the database system comprising data stored in at least two different data structures, these comprising a link data structure and a switch data structure, the link data structure logging for each link of the network its allocated identifier or identifiers, a service capability indicator, and all switches whose update status functionally affects the service capabilities of that link, and the switch data structure providing for each switch an index to the link data structure, logging thereby all links whose service capabilities are functionally affected by the update status of that switch, and storing for each switch the updates status indicator, the arrangement further comprising data input means to the switch data structure, for selecting one or more switches and changing the associated update status indicator for the selected switch or switches, the link data structure being responsive to said selection and change to update the service capability indicators for links whose service capabilities are functionally affected by the update status of the selected switch or switches.

Network updating arrangements of this second type are structurally similar to those according to the first aspect of the present invention, but can be driven from data representing a selection of switches for updating, rather than from data representing a selection representing link capacity per selected customer.

Preferably a network updating arrangement will incorporate both aspects described above.

According to a third aspect of the present invention, there is provided a method of updating a communications network, which network comprises a plurality of communication links with associated switches, each switch having a update status selected from at least two alternative statuses, the service capabilities of each link being functionally dependant on the update status of at least one switch, and the links being grouped according to allocated identifiers, each group sharing a common identifier, wherein the method comprises:

i) storing an indicator indicating the update status for each switch, in a first data structure of a database system;

ii) logging all links whose service capabilities are functionally affected by the update status of each switch, by means of a plurality of indexes to a second data structure of said database system;

iii) selecting, in respect of one or more identifiers, a minimum number of links in the group of links for which it is the common identifier; and iv) identifying an optimal set of switches, selected from the switches of the network, for which said selected minimum number of links will have different service capabilities as a consequence of changing the update status of each of said optimal set of switches.

Preferably, the identification of an optimal set of switches is carried out by means of a simulated annealing technique.

Also preferably, a method as described above might optionally include the steps of selecting a set of switches and changing the update status indicator of each switch of said set and identifying the links whose service capabilities would be changed as a consequence of a corresponding change in update status for the switches of said set.

Simulated annealing is a known problem solving technique in which one starts with a random solution to the problem and then varies parameters arbitrarily, looking at the effect on the solution. If the effect is beneficial, the parameter changes are accepted.

The simulated annealing technique is one of several known problem solving techniques. It is a fourth aspect of the present invention that there is provided a network updating arrangement based on the use of simulated annealing functionality.

In the network updating arrangements scenario, there are clearly a multiplicity of parameters which can be varied which affect a final solution. Embodiments of the present invention allow one or more selected parameters to drive the process. In an embodiment where an initial constraint is selected to be that a minimum service capability be provided to each customer, the lowest level of operation which might be made available for parameter variation in order to move towards a solution might be simply to start with the condition that 100% of exchanges are updated and then to delete identified exchanges until a solution can no longer be reached.

According to a fifth aspect of the present invention, operations available in a simulated annealing process, for use in a network updating arrangement, comprise "toggle exchanges" and "flip exchanges". In this context, these operations are respectively to select an exchange at random and change its update status, from off to on or from on to off depending whether it was initially off or on, and to select at random two exchanges having different update statuses and swapping their update statuses. That is, in a "switch" operation, a double "toggle" operation is applied.

It has been found that this combination of operations can be used to achieve a relatively optimal solution without extending the process over too long a period. A problem which can arise during a simulated annealing operation is that of local minima, where a new solution is apparently better than a previous solution but in fact leads the annealer to a less acceptable final solution. The toggle operation can quickly reduce the number of exchanges having positive update status, which is clearly to the good so long as a solution is still available, but can trigger local minima. The switch operation, however, can be used to escape from local minima.

BRIEF DESCRIPTION OF THE DRAWINGS

Embodiments of the present invention will now be described, by way of example only, with reference to the following drawings:

FIG. 2 shows a first data structure for use in carrying out the process represented by the flow diagram in FIG. 1;

FIG. 3 shows a second data structure for use in carrying the process represented by the flow diagram in FIG. 1;

FIG. 5 shows a flow diagram for the core structure of a simulated annealing technique for use in the network updating arrangement represented by FIG. 1.

DETAILED DESCRIPTION OF THE DRAWINGS

Figure 1:
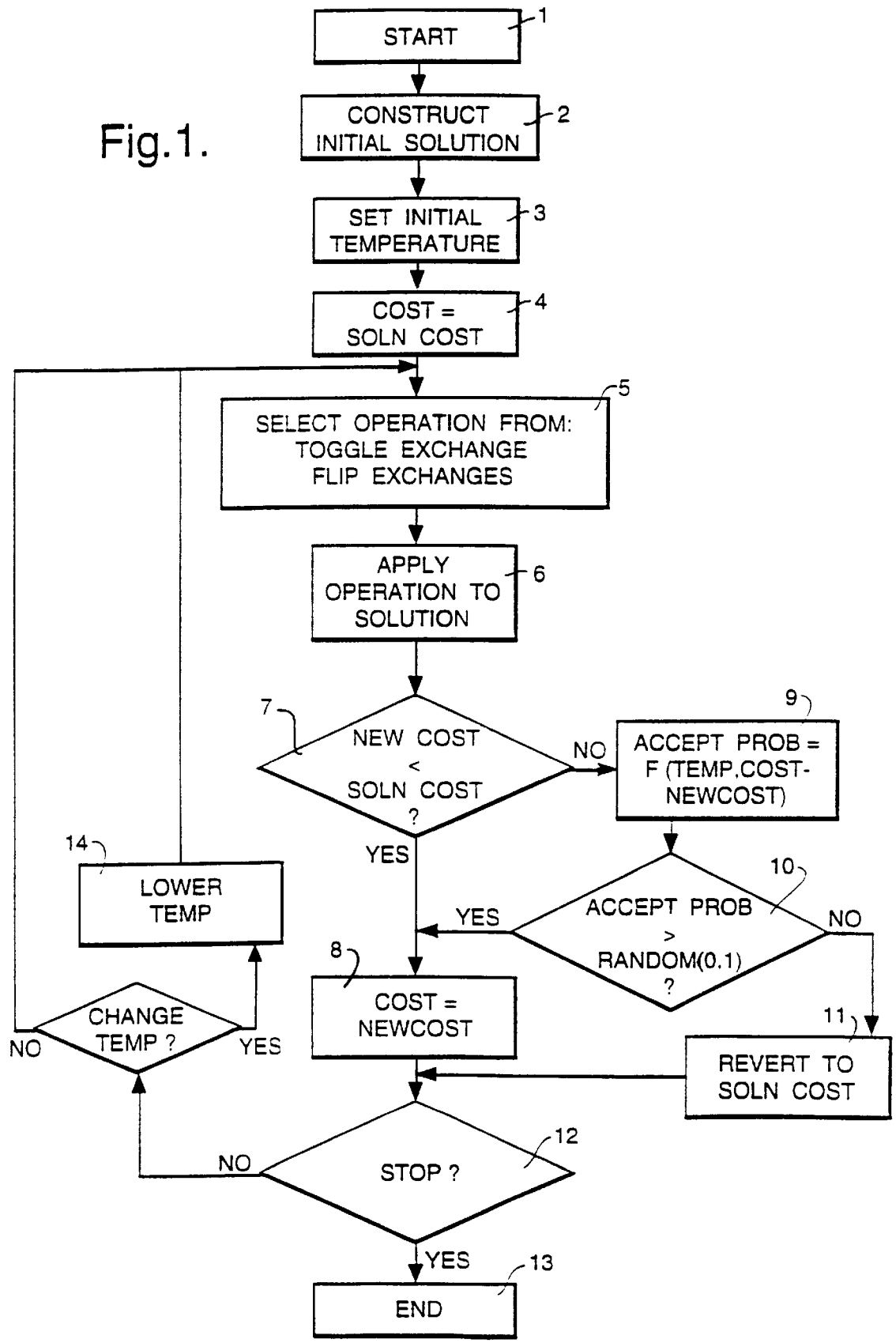
FIG. 1 shows a flow diagram for a network updating arrangement according an embodiment of the present invention.

In network updating arrangements according to embodiments of the present invention, the problem which is probably most difficult to solve is that of satisfying minimum requirements in terms of service capabilities for selected, or all, customers in a manner representing least cost/delay for the network operator. However, there are a number of scenarios which might be met. For instance:

1. it might be desirable that increased service capabilities be made available to a particular customer and an important question for the network operator will then be how many, and which, exchanges would be required to support that;

2. it might be found preferable to provide improved service capabilities to several selected customers. The network operator might then need to know what exchanges would be required in support, and what level of service capabilities can then be provided consequently to additional customers, not in the selected set;

3. it might be important to the network operator that specific exchanges are selected for early updating. The question then would be the level and location of improved service capability which would be achieved; or 4. the problem to be solved might be driven by a requirement that increased service capability be available on specific links. The solution to a question in those terms would then be identification of exchanges which can be updated to enable the necessary increased service capability.

All of these problems can be solved by equipment and processes according to embodiments of the present invention which adopt simulated annealing, this being an example of a "stochastic" technique, able to find a near optimal solution to problems which cannot be solved by conventional algorithms.

The following is a set of definitions for use in the description below.

WIRES

Each Wire is defined by

<wire-id>, {<supporting-exchange>}+, <dependant-customer>+

<wire-id> is a unique identifier for the wire, as used in the CAMMS database.

<supporting-exchange> is an exchange that must be present in order for this wire to be supported.

<dependant-customer> is a customer who is dependant upon the wire.

Typically a wire is supported by two exchanges, with one dependant customer. Exceptions to the rule necessitate this more general approach.

A wire is supported for improved services if and only if all its supporting exchanges are to be upgraded.

EXCHANGES

An exchange can be in one of two states to be upgraded or on.

not to be upgraded or off.

CUSTOMERS

For each customer two pieces of information are stored.

The number of wires that the customer is dependant upon.

The minimum percentage of these that must be supported.

SOLUTION

A valid solution is a set of exchanges that are to be marked on, such that each customer has at least the minimum percentage of wires supported.

The solution is notionally represented as a bit set. If the $i^{th}$ member of the bit set is 1 then the $i^{th}$ exchange is to be upgraded. If the $i^{th}$ member of the bit set is 0 then the $i^{th}$ exchange is not to be upgraded.

The starting point for a problem solving operation might be the requirement that certain wires must be supported. This might be a minimum percentage for each customer, or specific wires chosen by the customer from a set. The simulated annealing process then performs operations upon an initial solution with a view to minimising the number of exchanges marked on, subject to the bit set denoting a valid solution.

At the lowest level, there are two operations, these being to take an exchange currently marked off and to mark it on, and to take an exchange currently marked on and to mark it off.

In keeping with the simulated annealing approach it is necessary to work out the cost of these operations before they are performed. An operation is only performed if the chance it brings about is accepted by the metropolis function (metrop( )). It is for this reason that we have consider_on_chance( ) and consider_off_change( ). They work out the potential change in cost of turning an exchange on and off, respectively. This is performed by counting the number of customers that are left unsatisfied after the change and also the change in the number of exchanges. Clearly in the case of consider_on_change( ), the change in the number of exchanges is +1 and in the case of consider_off_change( ), −1.

Considering the implication of turning an exchange off is straight forward. For each exchange the list of supported wires is known. None of these wires can be supported if the exchange is turned off. Some may not currently be supported anyway because one or more of the other supporting exchanges is already off. For those that were supported hitherto it is necessary to decrement the count of any and all customers dependant upon them.

Considering the implications of turning an exchange on is more complicated. None of the wires that this exchange supports are currently supported. Some of them may be if the exchange is turned on, but only if all other supporting exchanges are on. For those wires where all supporting exchanges are not present it is necessary to increment the count of any and all customers dependant upon them.

As both operations are only considering potential chance, they make modifications to copies of the number of wires supported per customer.

The way the annealer might be implemented is a requirement that the algorithm always maintains a solution that satisfies all customers. Thus as soon as an operation results in a customer no longer being satisfied, it will not be applied. Thus consider_off_change( ) will stop as soon as one customer is no longer satisfied. This speeds up the routine by a factor of 3. Consider_off_change( ) is the most expensive function.

Stopping in the middle of consider_off_change( ) is not safe if it is followed immediately by a consider_on_change( ). Consider_off_change( ) could stop prematurely because customer X was no longer satisfied, only to find that consider_on_change( ) would correct the problem. Therefore, an additional argument is given to consider_off_change( ) to indicate when it is safe to perform this optimisation. Performance is aided by arranging for calls to be structured in such a way the optimisation is possible.

Once the potential effects of turning an exchange on or off are realised it is necessary to determine whether all customers' required minimum percentage of wire is met. As this task is common to both on and off changes it is performed in one function (consider_on_off_change( )). This function acts as a wrapper that hides consider_on_change( ) and consider_off_change( ).

If the operation is to be performed then the actual modification is performed by make_on_off_change( ). This function is very similar to consider_on_change( ) and consider_off_change( ) except it modifies the number of wires per customer and not a copy of this value.

As mentioned above, there are two relatively important high-level operations provided by embodiments of the present invention. These are the TOGGLE and SWITCH operations.

The first operation (TOGGLE) is the simplest and the only one that can lead to direct improvements in the solution. It selects at random a bit in the solution set and toggles its value. That is to say, it selects an exchange at random and, if it is on marks it off or if it is off marks it on. This operation is trivially supported by consider_on_off_change( ).

Whilst TOGGLE can quickly reduce the number of exchange, it may also get trapped in a local minimum. The second operation (SWITCH) is used to get out of local minima. It selects at random two exchanges, one that is on and one that is off. It then toggles both exchanges at the same time.

It might be thought that this operation is equivalent to two consecutive toggles but this is not the case. In the switch, the effect of the operation is only calculated after both toggles have been performed. The combination is more likely to be accepted than two individual toggles and therefore it is possible to move out of local minima. The net effect on the number of exchanges which are on and off is zero. If all customers are satisfied then this change will always be accepted by the metropolis functions.

The SWITCH operation is implemented by passing two exchanges to consider_on_off_change( ) to be toggled. If the second exchange is missing then consider_on_off_change( ) behaves as a single toggle.

It may be the case that more intelligent operations could be employed. This would have the effect of perhaps improving performance by examining more "promising" changes more frequently. The danger is the more intelligent operations would be computationally expensive.

A more interesting need for new operations would be if it could be shown that there are cases where a better configuration exists but that the TOGGLE and SWITCH operations are unlikely to be able to make the move. That is, in the same way that TOGGLE alone gets caught in local minima, there are more complex local minima that ensnare TOGGLE and SWITCH.

Such cases no doubt exist. Consider the following, where each letter denotes an exchange A =1, B =1, C =1, D =0, E =0.

A, B and C are caught in some sort of embrace such that all three of them can combine with other exchanges to support all customers but it is not possible to turn off any one of them and still satisfy all customers. It would, however, be possible to turn A, B, C all off and then turn D and E on and still satisfy all customers. This would be a better solution as it would require one less exchange.

It may be difficult to make this move using TOGGLE and SWITCH. It depends on how D and E behave with A, B and C. If no pair drawn from {A, B, C}×{D, E} can combine with others to satisfy all customers then it is difficult to see how the move could be made.

An operation that selected 5 exchanges, 3 on and 2 off and turned the 3 off and the 2 on would solve the problem. However, such an operation seems unduly specialised and the chances of selecting the correct combination of exchanges at the same time are so slim as to make the operation effectively worthless.

With the sort of numbers relevant to the current British private wire network, such an operation would select A, B, C, D and E at the same time, once every $10^{15}$ iterations.

The challenge is to find a more general operation that avoids local minima, but works with sufficient frequency to justify its inclusion. The best way to do this might be to introduce the new operation only at local minima (say when the cost has stayed constant for N moves) and to make it more sophisticated. That is, it would select some of the exchanges it operates upon by some means other than random.

Looking at the selection mechanism for operations, the SWITCH requires one exchange that is on and one that is off. If the initial solution consists of only exchanges that are on, then the SWITCH cannot be applied. An implementation might loop indefinitely trying to randomly select an exchange that was off. It is therefore necessary only to apply the SWITCH when there is at least one off exchange. However, it should be noted that the real value of the SWITCH is in escaping from local minima and that applying it too early is unnecessary. It is therefore possible to control when the SWITCH operation is performed by setting a FLIP parameter to an upper limit of the proportion of exchanges that are on before the SWITCH is employed. Thus, if FLIP is set to 0.7, the SWITCH operation will only be performed when 70% or less of the exchanges are marked on.

The TOGGLE operation is selected with a probability P. The SWITCH operation is selected with a probability 1-P. The default value of P is controlled by DEFAULT_OP1_PROB and might for instance be set to 0.5.

The process and operations described above are based on simulated annealing. The core structure of a simulated annealer is as follows:

```
Temperature : = initial_temperature;
for i : = 1 to num_iterations
        nsucc : = 0;
        for j : = 1 to num_over
        if (random( ) <toggle_prob)/* if operation 1 is to be performed */
                Δcost = toggle_operation(solution);
                if (metrop(Δcost, Temperature))
                        solution : = make_toggle_change(solution);
                        nsucc++;
                endif
        else                    /*operation 2 is to be performed */
                Δcost = switch_operation(solution);
                if (metrop(Δcost, Temperature))
                solution : = make_switch_change(solution);
                nsucc++;
                endif
        endif
        if (nsucc> nlimit)
                break
        end for j
        Temperature : = Temperature * T_FACTOR;
end for i
```

There are a number of variables here that can be adjusted to alter the performance of the algorithm. These are;

INITIAL TEMPERATURE

The value of the temperature variable is as crucial in this annealer as it is in any other. Set the initial value too high and early work consists of purely random modifications. Set the initial value too low and only improvements are possible and the annealer degenerates to a randomised hill climber.

NUM_ITERATIONS

The number of times around the main loop controls the number of times the temperature is dropped. Too low a value and the annealer does not have time to converge, too high and it takes longer to complete than is strictly necessary.

NUM_OVER, NLIMIT

These two control the number of operations that can be performed at each temperature step. "nlimit" defaults to half of num_over. That is if 50% or more of operations are successful then we skip to the next temperature step. The rationale for this is that the temperature is so high that modifications can be made too easily.

TOGGLE_PROB

This controls the probability that the toggle operation will be selected, as opposed to the switch operation. The rationale of this is already discussed above.

T_FACTOR

This controls the rate at which temperature is reduced. Values around 0.9 to 0.95 seem sensible. It would be possible to reduce temperature by a constant amount, as opposed to a multiplicative factor. The benefits of one approach over another are not clear.

In a simulated annealing operation, in general, one starts with a random solution. In the context of a network updating arrangement, this might be that all exchanges (switches) will be updated in order to achieve 10% of wires per customer having increased service capabilities. The annealing process then applies the two high level operations, TOGGLE and SWITCH, randomly to the solution. If the solution is improved, the system will accept the new solution, but if it worsens, it will only accept the new solution if it is likely the new solution in the long term will generate a better final solution. That decision is made at least partly in accordance with the "temperature", this representing a measure of the time taken or number of operations already performed by the system. The temperature is set initially at a value selected by experimentation, and reduced automatically by the system, for instance linearly with time or as a function of the number of iterations performed at each temperature.

Referring to FIG. 5, a flow diagram showing the core structure of the annealer can be set out as follows.

An operation starts at STEP 500. At STEP 501, the operator sets an initial temperature, decided after previous experimentation to achieve a reasonable starting point. The core structure then establishes a first loop, STEP 502, so that the process will repeat for a fixed number of iterations.

Within the first loop, the core structure establishes a second loop based on "nsucc". Before going into the second loop, "nsucc" is set at zero, STEP 503. The second loop is then established to run a fixed number of times, "num_over", STEP 504. This second loop takes individual exchanges and chooses whether a TOGGLE or a SWITCH operation is appropriate, STEP 507, and looks at the cost of the selected operation for each exchange in the light of the current temperature, STEPS 505, 506. As appropriate, the status of each exchange is then either changed or left unchanged, STEPS 505, 506, and "nsucc" increased if an exchange is upgraded.

The core structure will exit the second loop either because "j" has reached "num_over" or because an "NLIMIT" condition applies, STEP 508. This is the condition, discussed above, which allows the operation to move on, reducing the temperature more quickly, in the event that too many results are positive, indicating that the temperature was originally set too high. It is "NLIMIT" which reviews "nsucc".

The core structure will exit the first loop when a preselected limit on the number of iterations has been reached, STEP 509. Otherwise, the temperature is stepped down, STEP 510, and the second loop re-entered.

Referring to FIG. 1, a flow diagram showing the system in operation can be set out as follows.

The operation is triggered at step 1, START. It will accept an initial solution at step 2, for instance upgrading 95% of exchanges to achieve 20% increase in lines offering improved service capabilities. Step 3 is another data input step, the operator setting an initial temperature. The operator may at this stage also set "T_FACTOR", discussed above. At step 4, the COST variable is set to the cost of the initial solution selected.

Importantly, the system now randomly selects from two high level operations, TOGGLE and FLIP. In step 6, the system applies the randomly selected operation to the current solution. If the resultant cost, NEWCOST, is less than the cost set at step 4 above, then NEWCOST is accepted, these being steps 7 and 8. If, however, NEWCOST is not less than the SOLNCOST set at step 4 above, the system may still accept NEWCOST. It now applies step 9, that is it calculates the current value of a function of the temperature and of the relationship between NEWCOST and COST. In the light of this function, at decision step 10, the system will either decide to accept the NEWCOST, reversing to step 8, or abandon NEWCOST in favour of the previous SOLNCOST, at step 11.

At this point, there is a decision step 12 at which the system may decide the latest cost is acceptable as a final solution. If this is the case, the system proceeds to END, step 13. If, however, various conditions apply, such as the temperature remaining high or the latest value of COST being high, the system will make a check, step 14, as to whether the temperature is due to be changed, change or not change the temperature accordingly, and return to step 5, selecting the next operation to apply.

It should be noted that the function of temperature and COST, applied at step 9, is as follows:

$$f(t,c)=e^{-c/t}$$

The system described above can be put into operation using a standard computer. However, the computer has to be organised to provide relevant data structures and it is convenient to provide at least two related data structures, described as follows.

Referring to FIG. 2, data structures 20 associated with an individual wire (link) are shown. The main one is the pw_table 21. There is one entry 22 for every private wire. Each entry includes the wire-id (a string) as well as an indication of its type (KILOSTREAM, MEGASTREAM etc). (A "wire" in this context refers to a private customer link, extending from a first to a second set of terminal equipment and dedicated to the use of that customer.)

Each wire is supported by a number of exchanges. The list of exchange numbers is stored in the support table 23 and each pw_table entry 22 indicates the start and length of the list relevant to it. In FIG. 2 the first entry 22 in the pw_table 21 has three supporting exchanges 24.

Each wire is required by a number of customers. This is usually one, but can be more. The list of customer numbers is stored in the dependant_table 25. In FIG. 2 the first entry 22 in the pw_table 21 is required by two customers.

The number of entries 22 in the pw_table 21 is equal to the number of private wires (npws). As the number can be quite large and each entry must store the full wire ID, this array can be quite large (>10 Mb). The majority of the fields in a pw_table entry 22 are untouched during execution. The exception is the allocated flag which indicates at any point in time whether the wire is currently being supported (flag=='Y') or not (flag=='N').

The number of entries in the support_table 23 cannot be determined easily but it is calculated by mapper (not shown) and thereafter stored in shared memory (nsupports). Similarly with the number of entries in the dependant_table 25. Both of these arrays need only store small numbers and therefore size is not a problem. Data in these arrays is not manipulated during run-time.

Referring to FIG. 3, there are further data structures 30, centred around the exchange table 31, one entry 32 per exchange. When you are considering whether to use an exchange or not it is necessary to determine quickly what wires each exchange supports. These tables are in fact part of a single large table stored in shared memory. Each entry 32 contains an index 33 in the pw_table 21, indicating the wires supported by this exchange.

If two exchanges support the same wire then one entry in each of their tables will point to the same entry 34 in the pw_table 21. This is shown in FIG. 3.

The number of entries in the exchange table 3 is equal to the number of exchanges (nexchange). The number of entries in the individual tables is equal to the number of wires supported by that exchange. The total number of entries in the individual tables should be equal to the number of entries in the support_table 23.

At the end of an operation, the solution arrived at is a list indicating which exchanges are to be upgraded and which are not. This is represented by an array of 1 s and 0 s, with one entry for each exchange. If the $i^{th}$ entry is 1, then the $i^{th}$ exchange is to be upgraded.

The hardware used to run the simulated annealing operation will have a user interface. Referring again to FIG. 1, at step 1, to start the system off, and before the user interface can be started, the shared memory containing the data structures 20, 30 described above has to be created. This will be done in a manner determined by the file structures and directory structures employed in setting up the system.

Figure 4A:
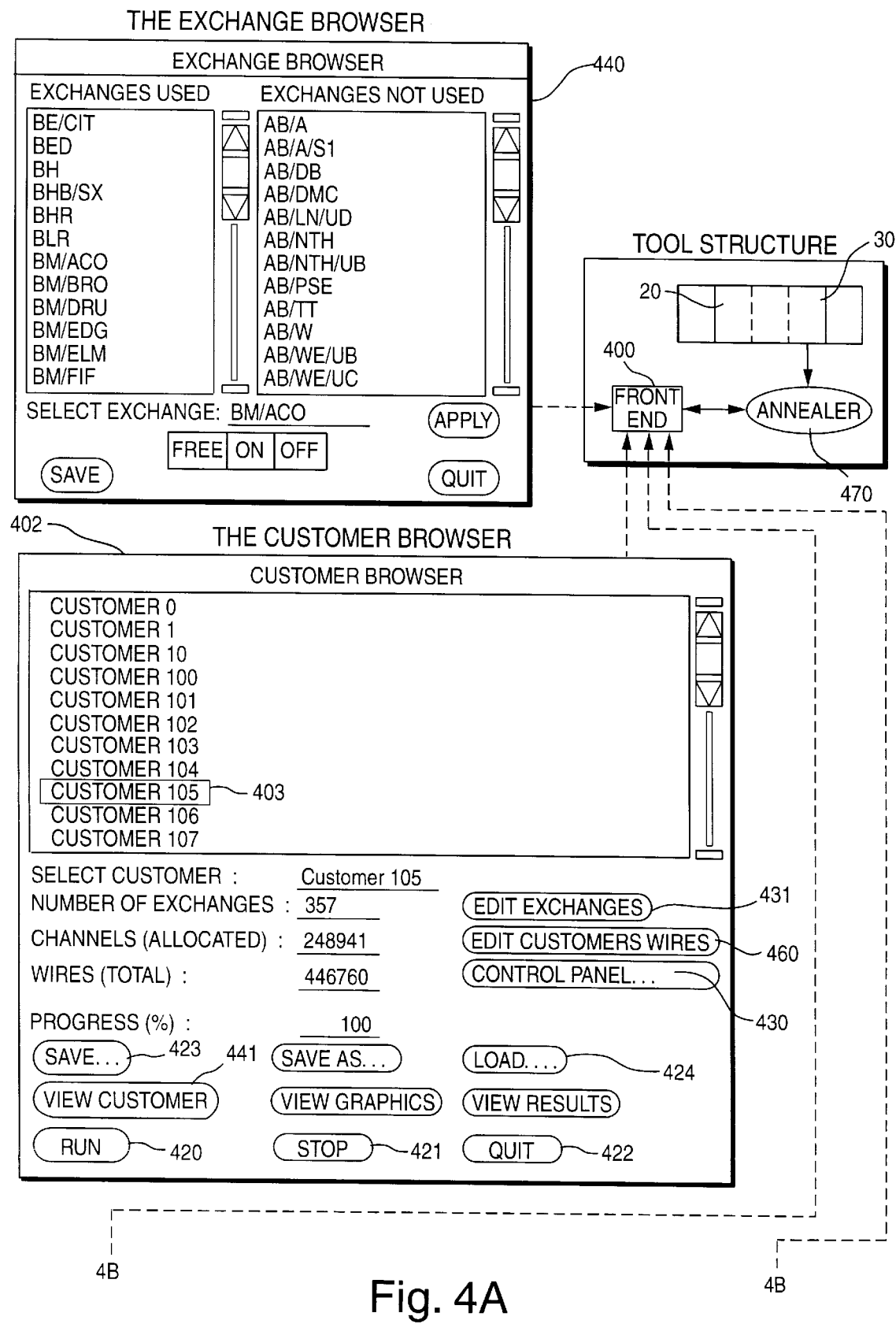
FIGS. 4A and 4B show apparatus for providing the network updating arrangement represented by FIG. 1.
Figure 4B:
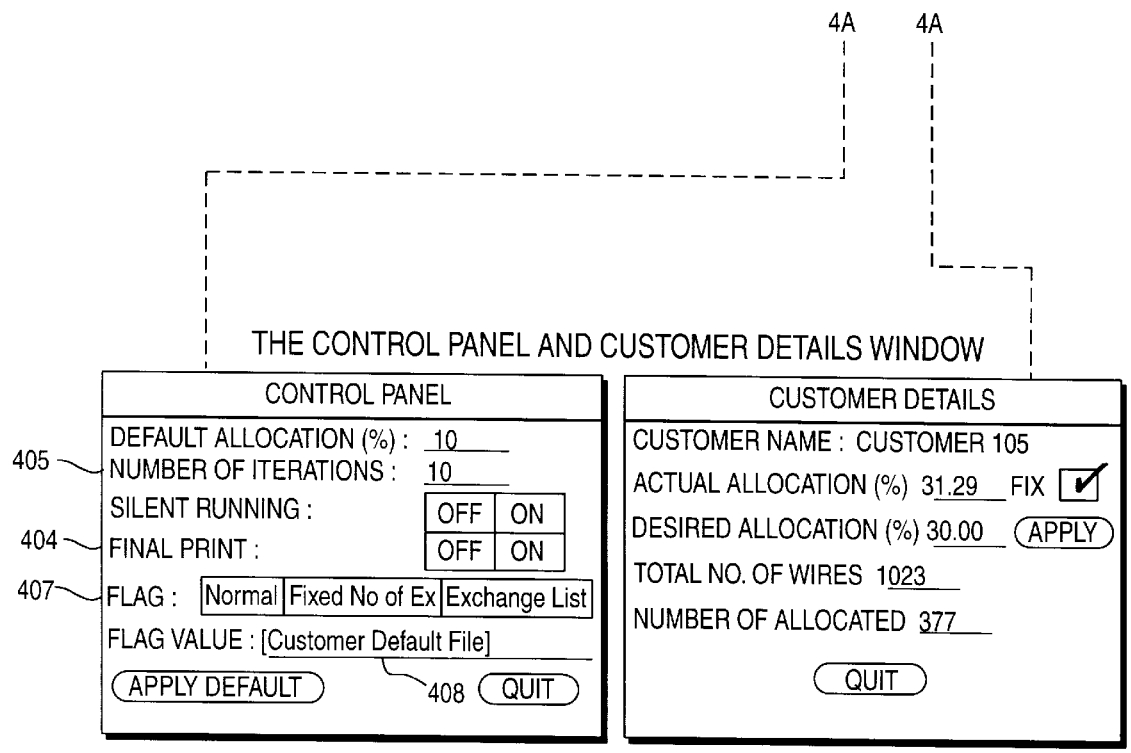

Referring to FIGS. 4A and 4B, suitable user interfaces 400 for use in embodiments of the present invention are known and can provide both data input means and indicator means. For instance, the user interface 400 may be a screen 402 showing a "customer browser" layout, the user being provided with a mouse to move an on-screen cursor 403 to select and change fields. By choosing certain fields, the screen layout can be changed, for instance to a "control panel" layout 404. Data can be input, for instance via the "Number of iterations" field 405, and information can be displayed, for instance in relation to a selected customer by means of a further alternative "Customer Details", screen layout 406. The progress of an annealing operation to find an optimal solution can also be monitored using an appropriate screen layout.

The user interface 400 and data structures 20,30, already described, interface with the data processing engine 470.

The following optimal screen layouts, together with the customer browser layout, can give considerable control to a user over the statistics the system is used to generate or view.

The "Customer Browser Window" provides the main point of the user interface 400. It can list all customers alphabetically and allow selection of a particular customer with the mouse. It can also show dynamically the current solution in terms of the number of exchanges to be upgraded, and consequently the number of channels to be upgraded. The total number of wires can also be shown.

The "customer browser" has buttons that allow starting the program (Run) 420, stopping it during execution (Stop) 421, quitting the application (Quit) 422, saving the current state (Save/Save As) 423 and restoring a saved state (Load) 424.

The "control panel" can be displayed by pressing the "Control Panel" button 430 on the customer browser window. Here the user can select an appropriate made for the tool (minimum cost or maximum customer satisfaction). By inserting the desired values in the spaces provided, the user can set a default allocation (the percentage of each customer's channels that must be upgraded) and the number of iterations (the time the annealer is allowed to reach a solution). The Flag menu 407 allows the user to select one of the three main uses of the annealer: "normal" means the annealer should minimise the number of exchanges used while achieving the desired allocation rates. Fixed No of Ex means the annealer should use the number of exchanges indicated in the Flag Value field 408 but maximise the number of channels that can be allocated, and Exchange List means that the file named in Flag Value 408 contains a list of exchanges and the annealer should determine what allocation would be achieved if these exchanges were upgraded.

More sophisticated control over allocation rates can be achieved by setting different rates for different customers. This is provided for by selecting a customer from the customer browser, and pressing the View Customer button, 441. In FIG. 4, Customer 105 has been selected and their details will then be shown in the "Customer Details" screen layout 406. The only editable field in the "customer details" window 406 is the one specifying the desired allocation; any entry in it will override the default allocation percentage set in the control panel and is valid for that customer only. In the example shown, Customer 105 will have a minimum of 30% of their wires allocated, while she rate is only 10% for all other customers.

Another alternative screen layout, the Exchange Browser 440 allows the user to supply additional constraints on exchanges. It is displayed by pressing the Edit Exchanges button 431 in the customer browser window. The exchange browser 440 displays alphabetically the exchanges that are currently upgraded/not upgraded. Each exchange can be selected with the mouse, or an exchange name can be manually entered in the space provided. Then the exchange can be set to free (the program may decide if it should be upgraded), on (this exchange must be upgraded) or off (this exchange must be upgraded). By default, all exchanges are free.

An arrangement according to an embodiment of the present invention can allow the user to specify that certain wires must be upgraded. As there may be several hundred thousand of them, this might be done on a per customer exchange basis. A customer is selected from the customer browser, then the button Edit Customers Wires 460 is pressed. This will display an "Edit Wires" screen layout, showing all the exchanges at which the customer owns wires. The user then selects an exchange at which wires are of interest, and presses an "Apply" button. This lists the wires the customer owns at that exchange. Selecting a wire and setting it to "on" using a toggle menu provided ensures that this wire will be upgraded by setting all exchanges this wire is connected to to "on".

The user interface 400 of FIG. 4 can also act as the indicating means for results of a planning operation. It can display a solution in at least three different ways:

i) As a table showing the customers, the number of wires and channels owned by them, and their desired and achieved upgrade levels. Note there might be a minimum allocation percentage for each customer, such as 10% set by means of the control panel screen display, but a different minimum allocation percentage, such as 30%, might be set for a selected Customer. The output file is suitable to be loaded into a spreadsheet.

For each customer, a complete breakdown can be shown by selecting a customer, and then pressing the right mouse button. This displays a popup menu with three choices: viewing all wires, viewing all upgraded wires or viewing all wires that were not upgraded.

ii) As a list of exchanges that were/were not upgraded. This is achieved by displaying an "exchange browser" screen layout after the program has been run.

iii) As a map showing the location of exchanges that were upgraded, either as a complete solution or for one or more selected customers.

It has been found that upgrading arrangements according to embodiments of the present invention can be used to generate solutions in upgrading processes in times of the order of an hour or two, that is, approximately 10 times as quickly as arrangements previously used. As will be understood from the description above, embodiments of the present invention can also be extremely versatile since the user can input any of a range of constraints to the process so that the "what if?" scenario can be solved for many different starting points. The core structure, described in relation to FIG. 5, simply provides a basis which can then be built on to look at many different scenarios in a complex environment.

A general description of an embodiment of the present invention is as follows:

A communications network updating arrangement comprising a data store, a data processor configured to apply a simulated annealing technique to data from the data store, a data and control input for controlling, and applying constraints to, the operation of the data processor in applying the simulated annealing technique, and a results indicator for showing the results of applying the simulated annealing technique to the data.

The data could be said to identify links of the network and to comprise the update status of switches of the network. The update status in this context will potentially constrain the capacity of one or more associated links to be used in providing a service or services. The data store may be said to comprise at least two data structures, a first for holding data concerning links of the network and a second for holding data concerning switches of the network. The data concerning switches of the network might comprise an index to the first data structure so as to identify any link or links whose capacity may be constrained by the update of individual switches.

Looking at use of an embodiment of the present invention in planning upgrades to the UK telecommunications network, input data to the planning tool is a number of business customers owning private wires served by links in a network comprising 6,000 exchanges. About 4,000 customer premises are involved and there is a total of just under 450,000 private wires, amounting to just under 700,000 channels.

The planning tool, which can of course be used without the "front end" described above, has functionality to allow specification of minimum upgrade levels, a fixed number of exchanges to be upgraded, and a proposed solution. Planning in phases can also be supported, and solutions can be saved and restored.

In a planning operation where cost is a constraint, of the two operations TOGGLE and SWITCH, TOGGLE operations from on to off always reduce cost and will be accepted as long as other constraints are still met. TOGGLE operations from off to on will increase cost but will be accepted with a probability proportionate to the number of channels that can be upgraded with the particular exchange. A SWITCH operation will of course generally be accepted if he operation results in a net gain in the number of channels supported. If there is a net loss, it will only be accepted in a manner inversely proportional to the net loss.

Thus, where there are dominant cost constraints, the tool will be biased towards updating large exchanges. However, a minimum upgrade level can be specified where a minimum number of channels must be upgraded for each customer.

It has been found, in the UK scenario described above, that the relationship between minimum upgrade levels and achieved coverage is non-linear. That is, the number of exchanges which have to be upgraded rises relatively slowly, until the upgrade level required reaches well over 50%. This sort of result will of course depend heavily on the actual network involved, however.

A major upgrade programme may have to be done in stages. Although a planning tool according to an embodiment of the invention can support planning in stages, generally there will be a worse overall result because, having completed the first stage, some exchanges will become upgraded and therefore "fixed". It may be a constraint that a fixed number of exchanges must be upgraded, in addition to there being a cost constraint. With this combination, the tool will tend to select exchanges that provide maximum value for money, ie those that allow the maximum number of channels to be upgraded, without regard to the distribution of upgraded channels over customers. It is possible to overcome this tendency to an uneven result by adding the "minimum upgrade" constraint so that customers get at least a minimum level of improved services or capacity.

What is claimed is:

1. A network updating arrangement, for a network which comprises a plurality of permanent communication links with associated switches, each switch having an update status selected from at least two alternative statuses, the service capabilities of each link being functionally affected by the update status of at least one switch, and the links being grouped according to allocated identifiers, each group sharing a common identifier, the arrangement comprising a database system for logging an update status indicator for each switch, the database system comprising data stored in at least two different data structures, these comprising a link data structure and a switch data structure, the link data structure logging for each link of the network its allocated identifier, or identifiers and all switches whose update status functionally affects the service capabilities of that link, and the switch data structure providing for each switch an index to the link data structure, logging thereby all permanent links whose service capabilities are functionally affected by the update status of that switch, and storing for each switch the update status indicator, the arrangement further comprising data input means to the link data structure, for selecting, in respect of one or more identifiers, a minimum number of the permanent links in the group of links for which it is the common identifier, and indicating means responsive to said selection to indicate one or more of the switches whose update status can be changed to enable predetermined service capabilities to be provided on said minimum number of links without changing the association between links and services, wherein each identifier corresponds to specific terminal equipment, said terminal equipment having access to the group of permanent links sharing that identifier for communications by means of the network.

2. A network updating arrangement, for a network which comprises a plurality of communication links with associated switches, each switch having an update status selected from at least two alternative statuses, the service capabilities of each link being functionally affected by the update status of at least one switch, and the link being grouped according to allocated identifiers, each group sharing a common identifier, the arrangement comprising a database system for logging an update status indicator for each switch, the database system comprising data stored in at least two different data structures, these comprising a link data structure and a switch data structure, the link data structure logging for each link of the network its allocated identifier or identifiers, a service capability indicator, and all switches whose update status functionally affects the service capabilities of that link, and the switch data structure providing for each switch an index to the link data structure, logging thereby all links whose service capabilities are functionally affected by the update status of that switch, and storing for each switch the update status indicator, the arrangement further comprising data input means to the switch data structure, for selecting one or more switches and changing the associated update status indicator for the selected switch or switches, the link data structure being responsive to said selection and change to update the service capability indicators for links whose service capabilities are functionally affected by the update status of the selected switch or switches.

3. A method of updating a communications network, which network comprises a plurality of communication links with associated switches, each switch having an update status selected from at least two alternative statuses, the service capabilities of each link being functionally dependent on the update status of at least one switch, and the links being grouped according to allocated identifiers, each group sharing a common identifier, wherein the method comprises:

i) storing an indicator indicating the update status for each switch in a first data structure of a database system;

ii) logging all links whose service capabilities are functionally affected by the update status of each switch, by means of a plurality of indexes to a second data structure of said database system;

iii) selecting, in respect of one or more identifiers, a minimum number of links in the group of links for which it is the common identifier; and iv) identifying by means of a simulated annealing process an optimal set of switches, selected from the switches of the network, for which said selected minimum number of links will have different service capabilities as a consequence of changing the update status of each of said optimal set of switches.

4. A method of updating a communication network, which network comprises a plurality of communication links with associated switches, each switch having an update status selected from at least two alternative statuses, the service capabilities of each link being functionally dependant on the update status of at least one switch, and the links being grouped according to allocated identifiers, each group sharing a common identifier, wherein the method comprises:

i) storing an indicator indicating the update status for each switch, in a first data structure of a database system;

ii) logging all links whose service capabilities are functionally affected by the update status of each switch, by means of a plurality of indexes to a second data structure of said database system;

iii) selecting a set of switches and changing the update status indicator of each switch of said set; and iv) identifying by means of said plurality of indexes the links whose service capabilities would be changed as a consequence of a corresponding change in update status for the switches of said set.

5. A network planning tool, for use in updating a communications network, the network comprising a plurality of communication links joined by switches to provide services to terminal equipment, wherein the service capability of each link is dependent on the update status of at least one switch, said tool comprising a first data structure, a second data structure and a user interface, the first data structure comprising a log of the links of the network, and of identifiers related to the links, each identifier being associated with specific terminal equipment served by a selected group of said links of the network, the second data structure comprising a log of the switches of the network, a log of update status indicators for the switches, and an index, for each switch, to the first data structure, which index provides a log of the links whose service capabilities are dependant on the update status for that switch, and the user interface comprising data input means for selection of any one of a group of variables, the group comprising a set of said identifiers, a number or capacity of links associated with each identifier, and a set of one or more switches, said tool further comprising indicator means responsive to a selection made by means of the data input means to indicate any of a group of data sets, said group of data sets comprising firstly an optimal set of switches whose update status can be changed so as to provide a minimum change in service capability of links having a common identifier, and secondly a number or capacity of links, grouped according to their common identifier, whose service capability will be changed by a change in update status of a selected set of switches.

6. A method for use in updating a communications network, the network comprising a plurality of switches which control routing for data or voice traffic on a plurality of traffic links, which method comprises the application of a simulated annealing technique to the problem of generating a set of switches selected from the switches of the network, which set of switches, on updating, facilitate improved service capabilities on links of the network according to predetermined requirements, wherein the method comprises the application of at least two alternative operations, these being a toggle operation wherein an update status relevant to a switch is changed regardless of whether it was initially positive or negative, and a switch operation wherein update statuses relevant to two switches are both changed in one operation, the initial update status for the two switches being different.

7. A method according to claim 6 which further comprises a selection step for selecting an operation to apply.

8. A method according to claim 7 wherein a toggle operation is selected unless one or more conditions are met.

* * * * *